United States Patent [19]
Gluck

[11] 3,949,233
[45] Apr. 6, 1976

[54] HAND HELD BAR CODE READER WITH CONSTANT LINEAR AMPLIFIER OUTPUT

[75] Inventor: Julius Gluck, Stamford, Conn.

[73] Assignee: Pitney-Bowes, Inc., Stamford, Conn.

[22] Filed: Aug. 15, 1974

[21] Appl. No.: 497,538

[52] U.S. Cl............ 250/555; 250/206; 235/61.11 E; 307/311
[51] Int. Cl.² .......................................... G06K 7/10
[58] Field of Search 250/206, 214 R, 555, 568–570, 250/205; 235/61.11 E; 307/311, 235 R, 251

[56] References Cited
UNITED STATES PATENTS

| | | | |
|---|---|---|---|
| 3,560,751 | 2/1971 | Buettner et al. | 250/555 X |
| 3,670,202 | 6/1972 | Paine et al. | 250/205 X |
| 3,770,967 | 11/1973 | Hanna et al. | 250/206 X |
| 3,813,540 | 5/1974 | Albrecht | 250/206 |
| 3,820,068 | 6/1974 | McMillin | 250/568 X |

OTHER PUBLICATIONS
Thomas et al., *IBM Technical Disclosure Bulletin* Vol. 16, No. 8, Jan., 74; pp. 2598–2600.

*Primary Examiner*—Walter Stolwein
*Attorney, Agent, or Firm*—William D. Soltow, Jr.; Albert W. Scribner; Peter Vrahotes

[57] ABSTRACT

A linear direct current amplifier with automatic gain control system for regulating the peak-to-peak amplitude of the signal output that is acquired by scanning a coded label with a hand-held photo optical scanner is disclosed. The gain is set primarily by the white background on the coded label and it is further adjusted at the black bar as the pen passes over the label surface on which the code is imprinted. Control circuit feedback compensates for input amplitude and contrast variations.

9 Claims, 4 Drawing Figures

HAND HELD BAR CODE READER WITH CONSTANT LINEAR AMPLIFIER OUTPUT

BACKGROUND OF THE INVENTION

This invention relates to a code-scanning system for acquiring and processing information that is stored in an array of width coded lines printed on a label or the like. In reading code formats of this kind, a light sensitive or photo-responsive device produces electrical signals that correspond to the relative intesities and duration of the light that is reflected from the sequence of lines and spaces.

In these systems, the amplified output signal, if not gain controlled, can be noisy (i.e. generate stray electrical signals) and the output amplifier requires a larger dynamic range amplifier for the output signal which will necessarily be required because of these input signals. Typical of the factors that can lead to excessive voltage range and possibly inadequate signals are:

a. Variation in the pen angle relative to the coded surface;
b. Changes in light source intensity and photodetector sensitivity;
c. Variations in label reflectivity;
d. Variations in print contrast;
e. Differences in amplifier gain characteristics.

In spite of the need to provide an automatic self-adjustment feature in these code scanning systems, a fully acceptable technique for stabilizing the peak-to-peak voltage output from the linear amplifiers that process the input signals has not been suggested.

Clearly, there is a need to provide some means for regulating the amplified output signal from these systems to function within a predetermined voltage range in spite of almost unpredictable fluctuations in the character of the light that is reflected from the labels.

SUMMARY OF THE INVENTION

In accordance with the invention, significant reduction in amplitude variation can be achieved by automatically controlling the system gain through stabilizing feedback circuits. In the system, the coarse gain is set by the white (or "non-black") background that the scanning pen registers and stores before it responds to black or darkly printed code bars.

Stabilizing the gain setting in response to the label border tends to compensate for almost all of the aforementioned factors that affect the system's linear amplifier output amplitude except for the contrast variation of the printed bars on the label. To compensate for this contrast variation, the input bias of a contrast control stage, and hence the gain of the variable gain amplifier which it controls, is set sufficiently high to satisfy the output requirement for the designed worst (or minimum) contrast between the white background and the dark code bars. Thus, the initial gain is set according to the reflected background illumination of the label by the photoresponsive pen, rather than any response to the coded bars.

DESCRIPTION OF THE PREFERRED EMBODIMENT

Figure 1:
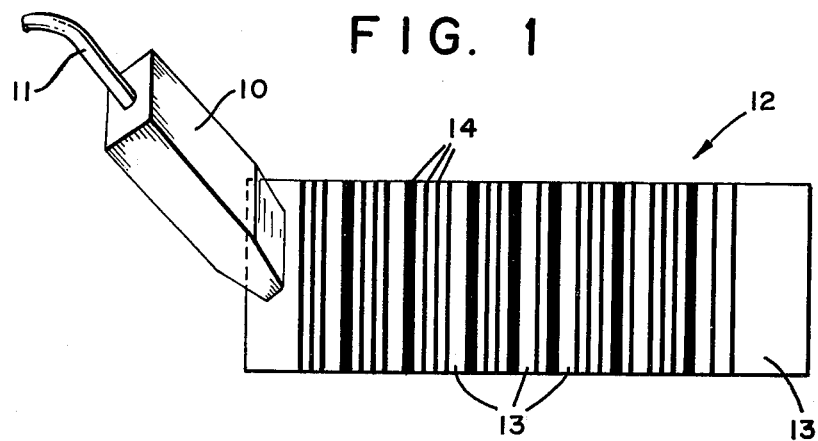
FIG. 1 illustrates a typical photoresponsive device for converting a printed bar code into corresponding electrical signals.

As shown in FIG. 1, a photosensitive "reader" scanner or "light pen" 10 responds to different levels of illumination by producing electrical signals that are generally proportional to the intensity of the incident light stimulation. One or more photocells can be secured within the scanner, along with a source of illumination (not shown in FIG. 1). Preferably, however, the light is carried through a flexible "fibre optic" cable 11. The cable conveys light from a coded label 12 to a remotely located photosensitive element and associated data processing system (also not shown in FIG. 1).

Preferably, label 12 has a light background 13 on which an array of black lines 14 are printed, although other coded contrast arrangements are within the scope of the invention. The relative widths, spacings and separations of the black line 14 reflect a pattern of coded information. Sales, inventory and stock re-order data are typical of the sort of material that is usefully coded in these circumstances.

The scanner 10 is swept across the label 12. A lamp, a light-emitting diode, or other source of illumination within the scanner 10 is focused on the label 12 and is swept across the label at the same time. Light, reflected from the label, is received in the fibre optic cable 11 and transmitted to a photo-diode for conversion into electrical signals.

Figure 2:
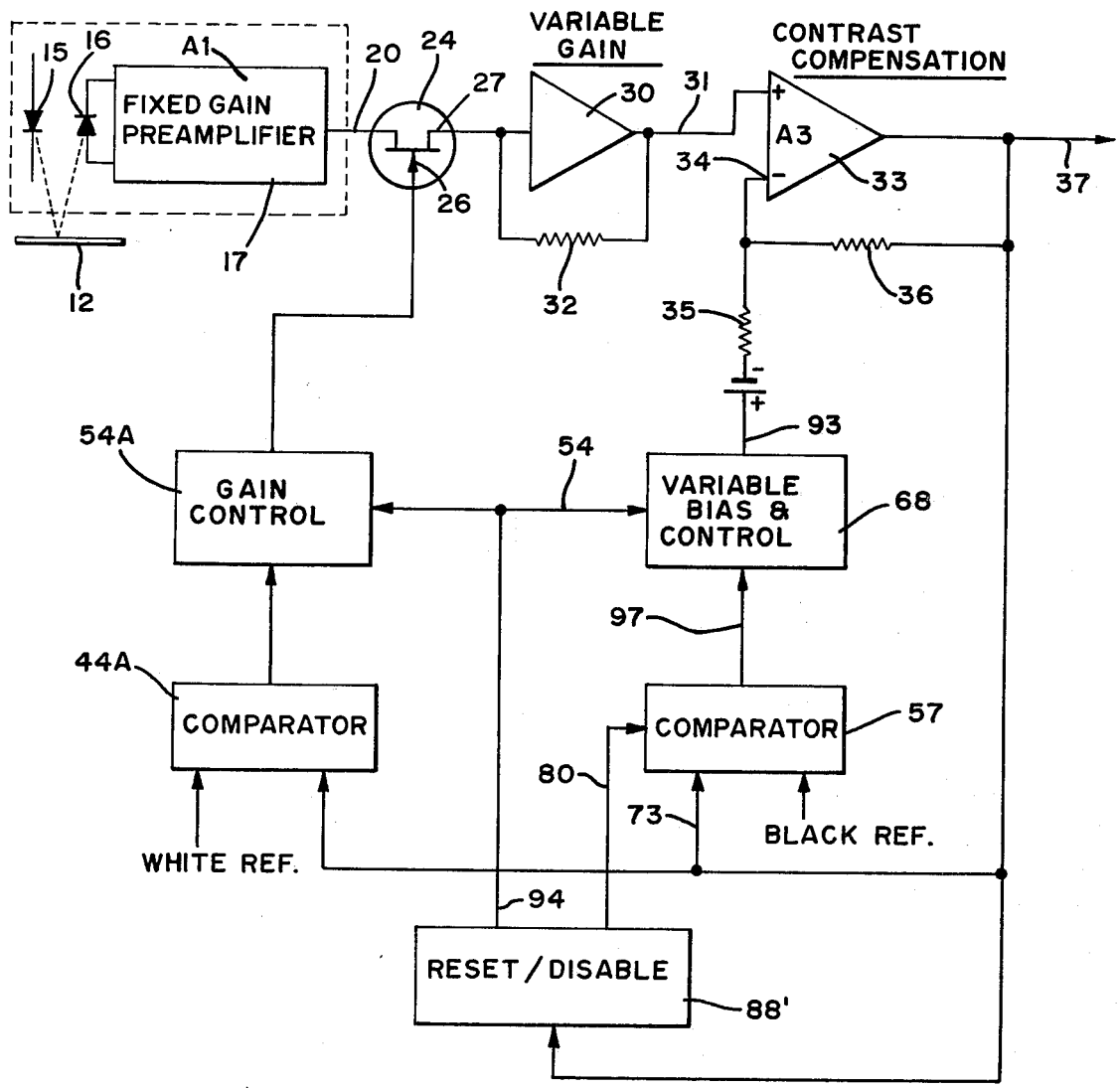
FIG. 2 is a block diagram of a typical circuit embodying principles of the invention.

As shown in FIG. 2, a typical circuit for practicing the invention comprises one or more light emitting diodes 15 which casts illumination on the coded label 12. Light from the diode 15 that is reflected from the label 12 is registered by a photodiode 16. The photodiode 16 responds by generating electrical signals that are related to the intensity of the stimulating light input.

Illustratively, gain stabilizing information acquired from the label 12 is stored in the form of voltage on the gate 26 (FIG. 2) of field effect transistor (FET) 24. The FET 24 is the gain control element of an operational amplifier that provides a variable gain stage 30. The output signal from the amplifier 30 forces another operational amplifier, or contrast compensating output stage 33 to reach the preset "white reference level" output signal while the pen "reads" the background illumination that is reflected from the label 12.

As the black bars are scanned and the signal in an output conductor 37 reaches the black reference level, a signal bias voltage that is applied to the contrast compensating stage 33 through a variable bias and control circuit 68 becomes less negative corresponding to a particular black contrast. Subsequently, upon registering signals from the white spaces, the gain of the amplifier 30 is reduced corresponding to a reduced bias so that the output signal excursion (which is the product of bias voltage, contrast and the gain of stage 33) falls between preestablished black and white reference levels. This way, the final gain setting of the amplifier 30 is determined by the black contrast through the variable bias circuit 68.

Figure 3:
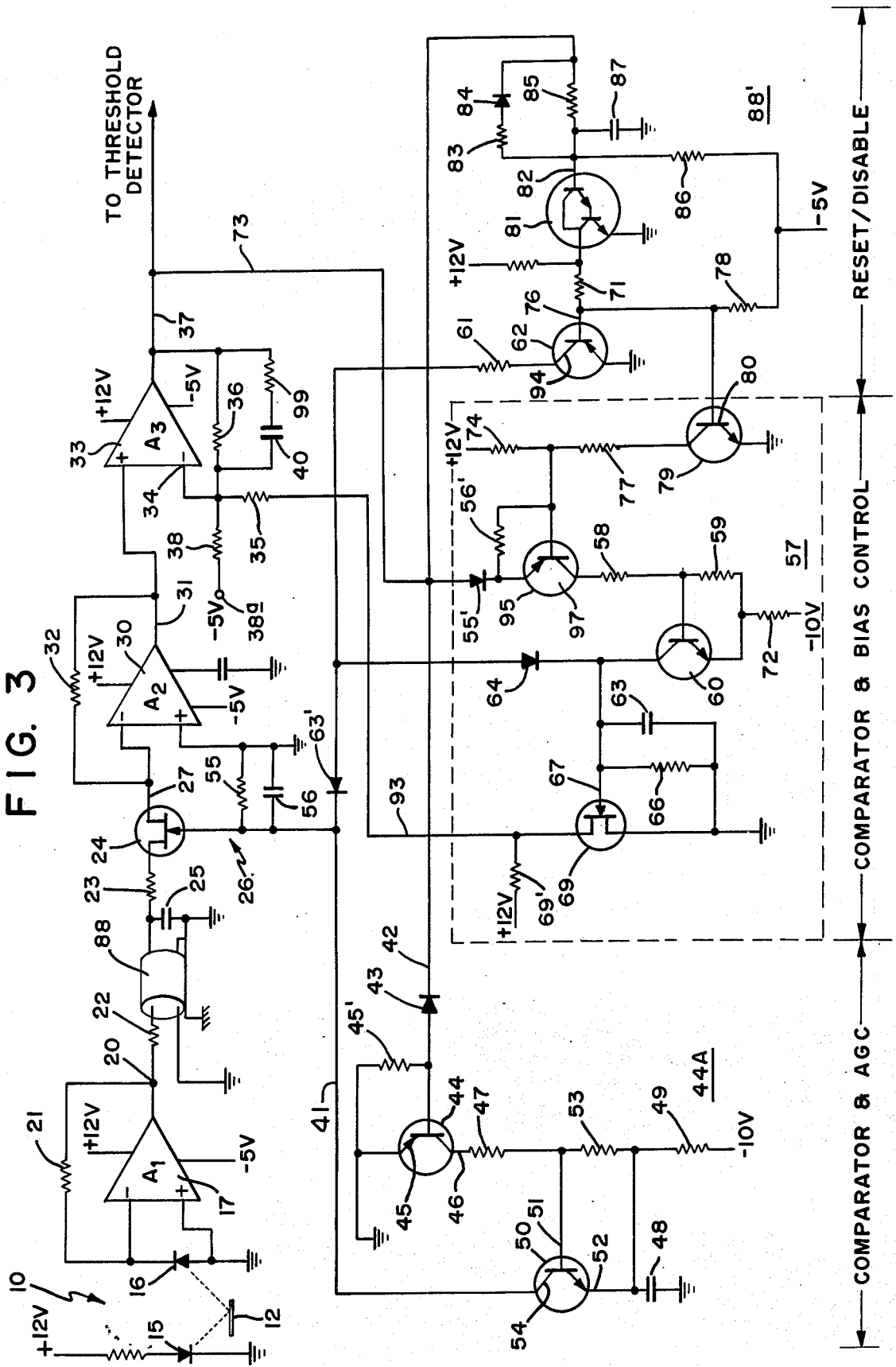
FIG. 3 is a detailed schematic drawing of the block diagram circuit shown in FIG. 2.

As shown in FIG. 3, the gain and the bias control voltage charges are stored on capacitors 56 and 63, respectively. These charges dissipate or leak away and, in this manner, tend to increase the gain and the bias voltage. If the background or white "bar" intensity and the black contrast remain unchanged, the charges in the capacitors 56 and 63 are just replenished in order to restore gain and bias during their respective active charging periods. If, however, the white bar intensity and the black contrast is increased, then the gain and bias control voltages also are increased rapidly above the previous levels thus reducing gain and bias. in the third possible condition if the white intensity and black contrast decreases, the gain and bias control voltages will be slowly reduced at a rate which is determined by the time constants of the respective combinations of the capacitor 56 and parallel connected resistor 55 for the gain control and the capacitor 63 and its associated parallel resistor 66 for the bias control.

In the illustrative circuit, 50 milliseconds (ms) after the scanner 10 passes the end of the label 12, light reflection terminates and black level comparator 57 (FIG. 2) on the gain is disabled. At the same time that the black comparator 57 is disabled, the gain and bias control voltages capacitor 56 and the bias control capacitor 63 are discharged to zero. These steps reset both the gain and bias voltages to maximum, enabling the system to respond to the least reflective ticket on the next turn. The black level comparator 57 is enabled by the white border of the next ticket.

Signals from the photodiode 16 are coupled to the input terminals of the operational amplifier or preamplifier and signal inverter 17. The output from the amplifier 17 is sent through a conductor 20. This output signal also is applied to an input terminal of the amplifier 17 by way of a feedback resistor 21 to regulate the amplifier's gain. The conductor 20 is connected through a resistor 22, a shielded cable 88 and another series resistor 23 to the drain terminal of the field effect transistor (FET) 24. Resistor 22 and capacitor 25 limit the noise band width of the amplifier system.

The FET 24 has a gate circuit 26 and a source circuit 27. As shown in FIG. 2, the source circuit 27 is directly coupled to the negative input terminal of the variable gain operational amplifier 30. The output signal from the amplifier 30 is sent through an output conductor 31. This output signal also is coupled to the negative input terminal of the amplifier 30 through a feedback resistor 32 at a junction that is common to the FET source circuit 27.

The output conductor 31 from the amplifier 30 is directly connected to the positive input terminal of the contrast compensation operation amplifier 33. A negative bias voltage is applied to the negative input terminal 34 of the amplifier 33 through a network that includes resistors 35 and 38. This bias voltage and the closed loop gain of amplifier 33 determines essentially the output signal amplitude. A feedback resistor 36 is connected in parallel with a resistor 99 and a capacitor 40. This parallel circuit joins the output circuit 37 of the amplifier 33 to the negative input terminal 34. The capacitor 40 and its series resistor 99 improve the transient response of the circuit. The output conductor 37 couples the signal to the balance of the system (not shown) for further processing or decoding as required.

For a more complete appreciation of the invention, attention is invited to feedback circuit comprising comparator 44A and gain control 54A (FIG. 2) This circuit includes a base circuit 42 that includes a diode 43 coupled to a PNP transistor 44. The transistor 44 has an emitter electrode 45 that is coupled to ground. The emitter electrode 45 also is connected to the base circuit 42 by way of a resistor 45$^1$. Collector circuit 46 for the transistor 44 is connected through a resistor 47 to the base circuit 51 for the NPN transistor 50. Emitter circuit 52 of the transistor 50 is coupled to the base circuit 51 through a path that includes a series resistor 53. Capacitor 48 and resistor 49 are added to the emitter circuit for improved transient response and filtering. The collector electrode 54 of the transistor 50 is coupled to the gate circuit 26 of the FET 24. The parallel connected resistor 55 and the gain control voltage capacitor 56 also are connected on the one side to the collector electrode 54 and the FET gate circuit 26 and on the other side to the positive input terminal of the amplifier 30. Diode 63 which discharges the capacitor 56 at the end of each scan is connected at its cathode to the FET gate circuit 26 and through its anode to the collector electrode 94 of PNP transistor 62.

Figure 4:
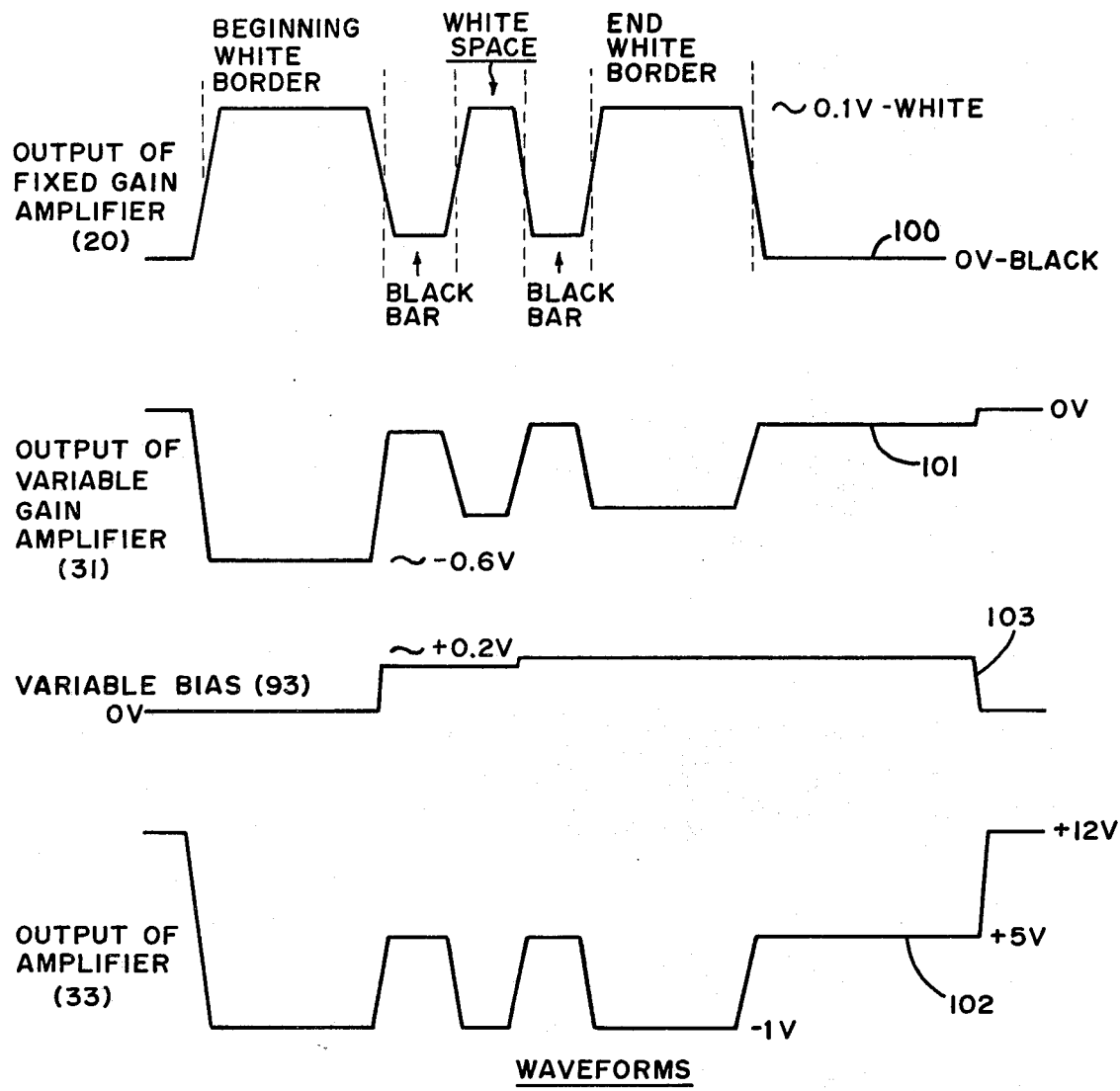
FIG. 4 is an illustration of various waveforms generated by the circuit.

In operation, signals in the conductor 20 that correspond to the initially observed background reflected illumination are applied to the FET drain. In this circumstance, the source to drain resistance of the FET 24 produces a voltage at the negative input terminal of the variable gain amplifier 30 that is inverted and transmitted through the output circuit 31 to the positive input terminal of the contrast compensation amplifier 33. The amplifier 33 is driven by this background illumination input signal to a predetermined "white reference level" voltage in the output circuit 37. Illustratively, as shown in contrast compensation amplifier output waveform 102 (FIG. 4) and this reference level is −1 volt in spite of the actual intensity of the reflected light. Thus, in accordance with a characteristic feature of the invention, a highly reflective background or a poorly reflective background nevertheless always causes the FET 24 to produce a preestablished output signal in the conductor 37. Upon establishing the white level (−1V) at the output 37 at the time the pen 10 contacts the white border of the label 12 a Reset/Disable circuit 88' is reactivated. Reactivation is accomplished by reducing threshold voltage of comparator 57 from +12 to +5v. This is done by the white level (−1v) holding a pair of Darlington connected transistors 81 in a nonconducting condition which, in turn, biases the transistor 79 on through a resistor 71 in the base circuit 80 of the transistor 79. Turning the transistor 79 into a conducting condition enables the black contrast comparator circuit 57 (FIG. 2). The PNP transistor 62 is a complement to the transistor 79. The base electrodes 76 and 80, respectively, are coupled together. Thus, the transistor 62 turns off when the transistor 79 is on. In order to generate in the conductor 37 a +5v signal when a black bar is scanned, the transistors 81 are still held off because the capacitor 87 cannot fully charge through the resistor 85 because the time constant of this combination is longer than the scanning duration of the widest black bar at the slowest scanning speed. Soon after the end of the label 12 is reached, however, the reflected light intensity is reduced and the signal in the output conductor 37 goes about +3v. At this output voltage after a longer period the transistors 81 become active and discharge the capacitors 56 and 63 in order to disable the black contrast compensation comparator 57 reduce the variable bias at conductor 93 and increase gain to maximum of the gain control stage 30.

While scanning the marked part of the ticket and passing a black bar the voltage in the base circuit 42 increases, causing the transistors 44 and 50 to stop conducting current. In this condition, the feedback circuit 41 between the output of the amplifier 33 and the input to the amplifier 30 no longer replenishes the voltage at the FET gate circuit 26. The capacitor 56, however, which stored an electrical charge, now maintains the FET gate voltage at a level that produces the voltage peaks which correspond to the black and white reference levels if the black contrast of incoming signal is 50% or more. This is the designed minimum acceptable contrast level for this illustrative embodiment of the invention. Black contrast, for the purpose of this invention may be defined by the formula:

$$C = \frac{W - B}{W} \qquad (100)$$

Where $C$ is the per cent contrast, $W$ is the voltage that corresponds to a "white" reflection 13 from the label 12 and $B$ is the voltage that corresponds to a "black" reflection 13 from the label 12 measured at the output of amplifier 17.

If the black contrast of the incoming signal is greater than 50%, then the peaks corresponding to black level in the output circuit 37 will tend to exceed the +5v black reference level output. In this situation, a diode 55' is forward biased, or conducts, along with transistors 95 and 60. When the transistor 60 conducts, it connects the capacitor 63 to the −10v supply by way of a resistor 72. Because the capacitor 63 is connected across the gate and source electrodes of an FET 69, the negative voltage on the gate increases the FET 69 drain to source resistance. As a result, and because of nearly constant current through a resistor 69' the drain voltage changes from near zero to a more positive value. See waveform 103 of FIG. 4. This reduces the normally negative bias that appears across the resistor 35. Thus, the voltage at the negative or invert input terminal 34 of the amplifier 33 becomes more positive. This new voltage opposes the voltage from the output conductor 37 and has a stabilizing effect on the tendency to exceed the +5v black reference level when contrast exceeds 50%.

The reflected light from the next "white" or background space will enable the capacitor 56 to recharge quickly if the reflected light intensity is the same as or greater than that of the preceeding space. If, however, the reflected light from the background that comprises the space under examination is of a lower intensity than that registered in the preceeding space, the charge on the capacitor 56 will discharge slowly. Also, the capacitor is charged more negative and, hence, the gain of the amplifier 30 is reduced, if during the previous black bar the negative bias to invert input 34 was reduced. This is the case as the first few black bars are encountered and if contrast is higher than the minimum acceptable design level.

Turning once more to FIG. 2, the circuit responds to the initial background illumination by developing a positive signal at the output of the fixed gain amplifier 17 as shown in illustrative preamplifier output waveform 100. This output signal is proportional to the intensity of reflected background light from the label 12. This positive amplifier output voltage, moreover, is further amplified and inverted by the amplifier 30 to provide negative voltage fluctuations at the output circuit 31 as illustrated by the examplary variable gain amplifier output waveform 101. This negative voltage has to keep amplifier 33 output at the white reference level, −1V, shown in the illustrative contrast compensation amplifier output signal 102 to keep a white reference comparator 44A of the AGC circuit active which in turn keeps the gate circuit 26 of gain control FET 24 at the stabilized gain level. Thus, to keep the amplifier 33 output at the white reference level, the input 31 has to be about as negative as the bias level at the invert input resistance 35. Since the bias control FET 69 (FIG. 3) is fully on, or conducting, before the scanner 10 reaches the black bars, the needed negative bias is provided by the voltage across resistor 35 generated by the current from a −5V source 38A that is coupled to the resistor 38. For the illustrated 50% designed minimum contrast this bias is approximately equal to a value that is twice the desired output swing in the conductor 37, divided by the gain of amplifier 33.

As the photodiode 16 registers the first black bar (assuming for illustrative purposes a perfect black condition of no reflected illumination, or 100% contrast, the output of the preamplifier 17 falls to zero. In this condition, the output from the variable gain amplifier 30 also declines from a preestablished negative level to zero. The output signal from the contrast compensation amplifier 33, however, becomes positive and seeks to reach a level that is equal to twice the desired output voltage swing. At reaching the black reference level, however, the black level comparator 57, previously activated upon the pen contacting tag's white border by way of the reset disable circuit 88', will make the bias to the comparator circuit transistor 95 and to the invert input of amplifier 33 more positive. This condition holds the signal in the output conductor 37 at the preselected black reference level. With an input signal of the arbitrarily selected 50% minimum contrast, "black" output signals from the amplifiers 17 and 30 are half way between the white and the zero levels, while the output signal from the amplifier 33 switches to the black reference level signal without activating the black comparator transistor 95.

The circuit shown in FIG. 3 can be simplified by eliminating the black contrast compensation circuit 57. This is accomplished by short circuiting the drain of FET 69 to ground and disconnecting circuits at diodes 55', 64 and base electrode 80 in NPN transistor 79.

In this circumstance, the black voltage peaks increase in amplitude in proportion to the black contrast. With the illustrative design that is shown in FIG. 3, 50% contrast corresponds to +5V and 100% to +11V black levels.

In passing, it should be noted that it is also possible within the scope of the invention to control gain of the system by regulating the current through the light emitting diode 15 by means of feedback from the output conductor 37.

Illustratively, as the scanner 10 registers the black bars (no reflected light), the current flowing through the light emitting diode 15 is maintained indirectly by capacitor through amplifier (neither is shown) which was charged to an appropriate level while the scanner 10 registered the "white" background. This process is analogous to the gate voltage of FET 24 of FIG. 2 which is maintained by the capacitor 56 to control the gain of that system during a black bar transition.

In operation, a nearly constant peak-to-peak amplitude and linear output is achieved by automatically controlling the system gain through multiple, stabilizing, feedback circuits that are activated in a stepwise manner.

As shown in FIG. 2, these feedback circuits include the variable bias and control circuit 68 and the gain control voltage capacitor 56 with its associated components, e.g. the FET 24. With this approach, the gain is set by the level change or contrast between light reflected from "white" background and the "black" bars and the black and white reference levels.

There are three linear amplifiers in the system. The preamplifier 17, as hereinbefore mentioned, is a fixed gain amplifier and preferably is located within the scanner 10. The variable gain amplifier 30 is the gain controlled stage in which the white output level signal always is equal to the negative bias at the invert input of the contrast compensation amplifier 33. The "black" output signal from the amplifier 30 corresponds to zero reflected light and, in this illustrative circuit, is a zero output signal. The gain of the amplifier 30 is controlled by the "white" level signal at the amplifier 33 output. This amplifier 33 is a fixed gain stage with fixed and variable bias at its invert input. The variable portion of the bias is controlled by the "black" level signal in its output conductor 37 and, therefore, depends on the contrast in the reflected light 13.

Before the scanner 10 reaches the white border of the label 12, the gain of the gain controlled amplifier 30 gain is at maximum. Upon reaching the white border, the gain of the amplifier 30 is reduced to some intermediate level that is determined by the intensity of the reflected light from the white border of the label 12. This gain is sufficient to deliver the necessary output voltage swing for a predetermined worst contrast condition in which, for example, the circuit values are selected for a minimum contrast, as hereinabove noted, of 50%. Simultaneously, the white level in the output conductor 37 reaches the predetermined reference level of −1V. Concurrently, the black level response is established through activation of the reset-disable circuit 88'.

Upon reaching the white border, the circuit 88' reduces threshold of comparator 57 from +12V (blocking) to +5V. Then when the first black bar is reached, amplifier 33 output reaches +5V with bars of 50% or greater contrast. Thus when the black level comparator input reaches +5V, circuit 68 (variable bias control) of FIG. 2 makes the invert input bias to amplifier 33 a more positive level, depending on the input contrast, to make the output signal in the conductor 37 output agree with the preset "black level" of +5V. As the first "white bar" in the coded array is reached, the gain of the amplifier 30 is further reduced to match the less negative bias on the invert input to the amplifier 33.

Both the gain setting of the amplifier 30 and the variable portion of the bias setting that is coupled to the invert input to the amplifier 33 are stored by the capacitors 56 and 63, respectively.

As the scanner 10 moves across successive white and black bars, the charge on the capacitors are alternately refreshed if the black and white bar signals remain constant. These capacitors, however, are almost instantaneously charged more negatively if the contrast between the bars increases. Automatic gain adjustment to reduce a reduced bar contrast is slower and is proportional to the time constant of the parallel sets of resistor 55, capacitor 56, resistor 66, and capacitor 63. Fifty milliseconds after the scanner 10 is moved past the end border of the label, the capacitors 56 and 63 are discharged. The amplifier gain and bias settings are restored to initial settings and black comparitor circuit is disabled through the circuit 88'. Thus, as the scanner moves from label to label, the white and black reference levels remain constant in spite of changes in contrast or intensity that can be caused by a number of uncontrolled variations in contrast due to label printing, pen tilt angle, light source intensity, light detector characteristics, label reflectivity, and the like. This principle can be embodied in a number of equivalent circuits of which the foregoing illustrative circuit is described in detail.

In this regard, appropriate circuit modifications can be made within the scope of the invention to rely on a "white" background or border to establish the initial reference conditions for circuit operation.

Typical component values for the circuit shown in FIG. 3 are:

| Component | Value or Identification |
| --- | --- |
| LED 15 | Conventional |
| Diode 16 | Conventional |
| Resistor 21 | 100 M Ω |
| Resistor 22 | 100 Ω |
| Resistor 23 | 100 Ω |
| Capacitor 25 | .01f ($\mu f$) |
| F.E.T. 24 | VcR4N |
| Resistor 55 | 1M Ω |
| Capacitors 56 | 10 $\mu v$ |
| Capacitor 63 | CR 12 |
| Transistor 44 | 2N3906 |
| Resistor 45' | 33 k Ω |
| Resistor 47 | 100 Ω |
| Transistor 54 | 2N3904 |
| Resistor 53 | 3.3 K Ω |
| Capacitor 48 | 10 $\mu f$ |
| Resistor 49 | 100 Ω |
| Amplifier 30 | Lm 308 |
| Amplifier 17 | LH 0052C |
| Amplifier 33 | $\mu$A741 |
| Resistor 35 | 6.2K Ω |
| Capacitor 40 | 680 p f |
| Resistor 36 | 120 k Ω |
| Resistor 99 | 47K Ω |
| Resistor 69' | 10K Ω |
| Bias Control FET 69 | 2N5640 |
| Resistor 66 | 1M Ω |
| Capacitor 63 | 10$\mu f$/15v |
| Diode 64 | 1N4148 |
| Transistor 60 | 1N4148 |
| Resistor 72 | 10 Ω |
| Resistor 59 | 3.3K Ω |
| Resistor 58 | 100 Ω |
| Transistor 95 | 2N3906 |
| Diode 55 | 1N4148 |
| Resistor 56' | 10K Ω |
| Resistor 74 | 1K Ω |
| Resistor 77 | 510 Ω |
| Transistor 79 | 2N3904 |
| Resistor 61 | 10K Ω |
| Transistor 62 | 2N3904 |
| Resistor 73 | 15K Ω |
| Resistor 71 | 10K Ω |
| Transistor 81 | MPS-A12 |
| Diode 84 | 1N4148 |
| Resistor 83 | 1K |
| Resistor 86 | 1.5M Ω |
| Capacitor 87 | 0.22 $\mu f$ |
| Resistor 85 | 390K Ω |

Thus, there is provided in accordance with the invention, a technique for stabilizing the gain of an amplifier system that responds to illumination reflected from a coded surface. As shown in the foregoing illustrative embodiments of the invention, this gain control is established through a feedback system that adjusts the signal amplitude or the illuminating current in response to the light that is reflected from the coded source.

While the invention has been particularly shown and described with reference to a preferred embodiment thereof, it will be understood by those skilled in the art that changes may be made in various details without departing from the essential contribution of the invention.

What is claimed is:

1. A system for stabilizing the gain of a circuit that responds to reflected illumination of different intensities comprising means for generating a pulsating signal that is related to the intensities of the reflected illumination, amplification means responsive to said signal generating means for amplifying said generated signal into one of two predetermined levels when the black contrast is above the designed minimum level of the reflected illumination and a feedback circuit for preserving said amplified signal linearity and pulse width.

2. A system according to claim 1 wherein said means for generating a signal that is related to the reflected illumination further comprises a light source for producing said reflected illumination, and a photosensitive device responsive to light from said source for generating a signal that is related to reflected illumination intensity from said light source.

3. A system according to claim 2 wherein said feedback circuit further comprises a plurality of transistors for selectively coupling said amplified signal to said light source in order to regulate the output therefrom and stabilize the intensity of the reflected illumination in spite of random contrast fluctuations.

4. A system according to claim 2 wherein said light source further comprises a light emitting diode to provide the source of light and a photodiode for generating a signal that is related to reflected illumination from said light source.

5. A system according to claim 1 wherein said means for generating a signal that is related to the reflected illumination further comprises a photosensitive device for producing a signal that is related to the reflected illumination intensities, and a field effect transistor in said feedback circuit for controlling the gain of the amplification means in the intensities of the reflected illumination.

6. A system according to claim 5 wherein said photosensitive device further comprises at least one photodiode.

7. A system according to claim 5 wherein said feedback circuit further comprises a transistor responsive to said amplified signal and coupled to said field effect transistor gate for stabilizing the response of the system.

8. A system according to claim 7 wherein said feedback circuit further comprises another transistor responsive to said transistor, said another transistor being coupled to said field effect transistor gate to stabilize the response of the system to the reflected illumination.

9. A circuit to identify two conditions of contrasting illumination intensities for enabling gain control circuits when a hand-held photo sensitive scanner senses the non-black background on which relatively dark code bars are imprinted and disabling said circuits when said scanner is lifted and senses no reflection comprising, a scanner for registering the illumination and producing an initial signal that is related to the intensity of the illumination, a variable gain amplifier output signal that characterizes one of said illumination intensity conditions is a predetermined value, a contrast compensation amplifier having two input terminals, one of said input terminals is coupled to said variable gain amplifier output signal and the other of said input terminals is biased to said predetermined value and an output terminal for indicating that the circuit has switched into one of the two predetermined states, a feedback circuit for applying a variable bias to the other of said input terminals in response to the other of said illumination intensity conditions, and further feedback circuit means for regulating the gain of said variable gain amplifier in accordance with the output state at said output terminal.

* * * * *